Nov. 30, 1965  D. PECCERILL  3,220,235
METHOD AND APPARATUS FOR MAKING BULGED ARTICLES
Filed Sept. 19, 1961  2 Sheets-Sheet 1

INVENTOR
Donald Peccerill
BY
Spencer, Rockwell & Bartholow
ATTORNEYS

Nov. 30, 1965  D. PECCERILL  3,220,235
METHOD AND APPARATUS FOR MAKING BULGED ARTICLES
Filed Sept. 19, 1961  2 Sheets-Sheet 2

INVENTOR
Donald Peccerill
BY
Spencer, Rockwell & Bartholow
ATTORNEYS

United States Patent Office 3,220,235
Patented Nov. 30, 1965

3,220,235
METHOD AND APPARATUS FOR MAKING BULGED ARTICLES
Donald Peccerill, West Haven, Conn., assignor, by mesne assignments, to National Lock Co., Rockford, Ill., a corporation of Delaware
Filed Sept. 19, 1961, Ser. No. 139,243
4 Claims. (Cl. 72—62)

This invention relates generally to a method and apparatus for making bulged articles and more particularly to making bulged articles from drawn metal blanks whereby a fluid is introduced into the blanks, thereby causing them to expand and fill a die cavity having the desired configuration of the final product.

This invention relates to the final step of producing a door knob or other similar hollow item upon a single-stage machine or a multi-stage machine provided with a plurality of stations and performing the plurality of steps required to transform a flat metal sheet into a hollow door knob. At stations of the machine prior to the station described herein, a piece of sheet metal blank is cut, drawn and necked to form the blank which will be operated on in the stage hereafter described to form the finished product. The method and apparatus described herein are adapted to be employed in expanding mechanisms such as described in my copending application, Serial No. 861,303, filed December 22, 1959, now Patent No. 3,094,091. However, it is to be understood that the mechanism and method hereafter described can be used equally as well on other ram-type machines.

The machine described herein differs among other things from the machine of the above-mentioned copending application in that at least a part of the fluid which supplies the expanding pressure is injected directly into the article to be expanded and not into an expandable bag as is disclosed in the copending application. While this causes the fluid to be used up contrary to the operation of my earlier invention, this method permits the use of a less complex and, therefore, less expensive apparatus.

Accordingly, it is an object of this invention to provide a simplified apparatus for producing bulged sheet metal articles.

Another object of the invention is to provide a novel method for producing bulged articles.

A further object of the invention is to provide means whereby a hollow article may be expanded to fill a die cavity by having a fluid injected under pressure therein.

A still further object of the invention is to provide an inexpensive method for hydraulically expanding bulged articles by use of an expendable fluid.

Still other objects and advantages of the invention will in part be obvious and will in part be apparent from the specification.

The invention accordingly comprises the several steps and the relation of one or more of such steps with respect to each of the others, and the apparatus embodies the features of construction, combinations of elements and arrangement of parts which are adapted to effect such steps, all as exemplified in the following detailed disclosure, and the scope of the invention will be indicated in the claims.

Generally speaking, in accordance with the invention, a cupped blank is inserted in a pair of open, mating dies having a cavity which, when closed, forms the configuration of the final desired product. The cupped blank is inserted in the open dies with the open end of the blank covering a valve in a ram cylinder. The cylinder is filled with a fluid such as water and carries a piston attached to a ram. As the ram comes down, it causes the piston to compress the fluid in the cylinder, thereby forcing some of the fluid into the cupped blank to fill the blank and prevent it from collapsing when the dies are closed. Thereafter, the dies are closed by a mechanism operating independently of the ram and further travel of the ram causes the pressure to be built up in the cupped blank, expanding it until it contacts the side walls of the die cavity. When the ram is withdrawn, releasing the pressure, and the die halves are opened, the finished bulged article may be removed and emptied of the fluid remaining therein.

For a fuller understanding of the invention, reference is had to the following description taken in connection with the accompanying drawings, in which.

Figure 1:
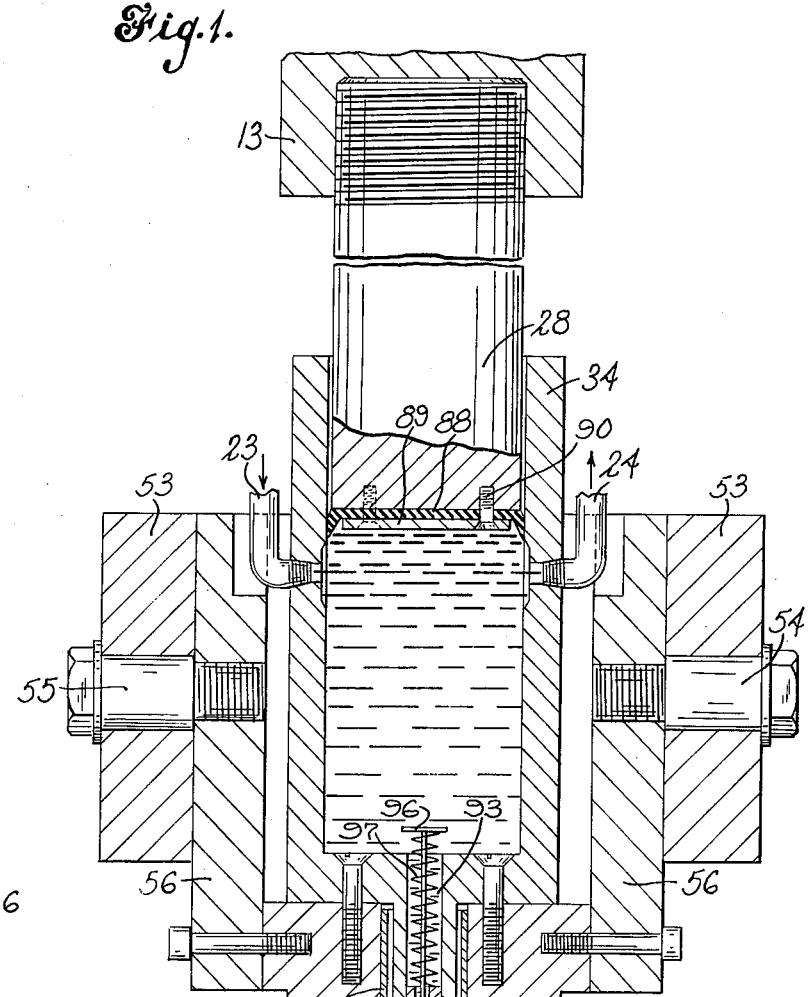
FIG. 1 is a cut-away sectional elevational view of the apparatus of the invention with the hollow blank in place prior to commencement of operation of the mechanism.
Figure 5:
FIG. 5 is a view of the cupped blank prior to being expanded in the stage described herein.
Figure 6:
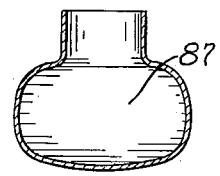
FIG. 6 is a sectional view of the completed article.

Referring now to FIG. 1, a multiple-stage machine (not shown) carries a plunger at each stage. For this particular application, the final stage of the machine is shown having a plunger 13 and a die bed 14 positioned to cooperate therewith. A piston 28 is suitably attached to plunger 13, the piston entering the chamber of a cylinder 34. A sealing ring 88 is attached to the head of piston 28 by means of a plate 89 and screws 90. The sealing ring 88 forms a seal between piston 28 and the walls of cylinder 34 to prevent fluid in the cylinder from escaping past the piston during movement of the piston as will hereafter be described. Attached to the end of cylinder 34 is an upper die 60 having a die cavity 61 therein. Positioned opposite upper die 60 is a lower die 44 having a die cavity 45 therein, the lower die being carried by die bed 14. Die cavities 45 and 61 are shaped so as to form the outer configuration of the final desired product when the upper and lower die halves are closed upon each other. Slidably mounted in lower die 44 is a knock-out rod 46 which is positioned so as to enter die cavity 45 from within the lower die as will hereafter be described.

Upper die 60 is suitably mounted on a die carrier 56 which is supported by a loop portion 53 through trunnions 54 and 55. An ejecting sleeve 63 is slidably mounted in upper die 60 to abut the necked portion 86 of a blank 85 as will hereafter be described.

Cylinder 34 extends into upper die 60 an amount sufficient to enter the necked portion 86 of the cupped blank 85 when the blank is in position in the die cavity 61. A flexible seal 91 is attached, by means of a valve seat 92, to the end of projecting portion of cylinder 34. A passage 93 extends through valve seat 92 and through the cylinder head into the cylinder chamber in which is riding piston 28. A valve 94 is positioned to seat in valve seat 92 and has a valve stem extending from the valve and terminating in a plate 96. A spring 97 encircles valve stem 95 and extends between plate 96 and valve seat 92 so as to maintain closure of the valve. Flexible seal 91 is positioned to enter the necked portion 86 of cupped blank 85 and form a sealed passage between the interior of the cupped blank and the cylinder while the blank is being operated on.

An inlet passage 23 is attached to a wall of cylinder 34 and permits passage of fluid to fill the cylinder cavity.

An overflow passage 24 is also attached to cylinder 34 to allow excess fluid to escape from the cylinder.

Figure 2:
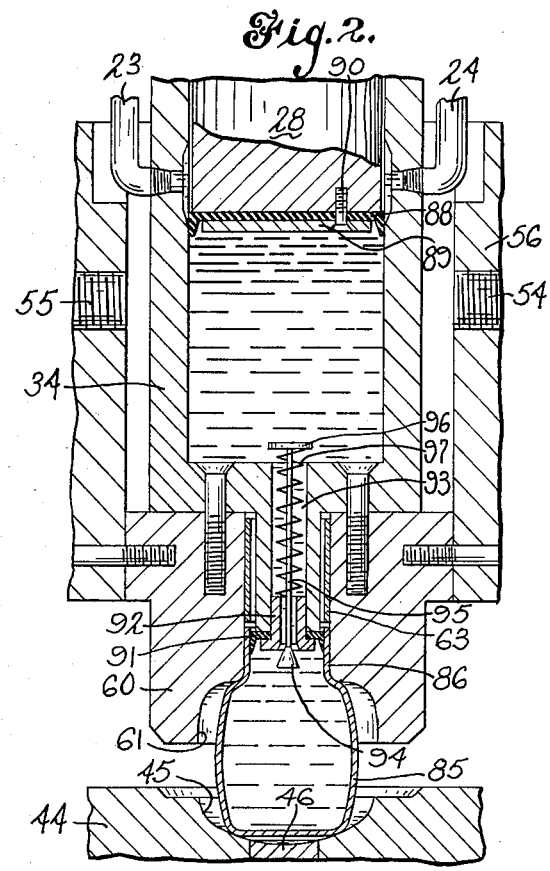
FIG. 2 is a partial view similar to FIG. 1 after commencement of operation of the ram mechanism but prior to closure of the die.

In operation, when plunger 13 is fully raised and upper and lower dies 44 and 60 are open as is shown in FIG. 1, a cupped blank 85 having a necked portion 86 is inserted in the die cavities with the necked portion sealed by flexible seal 91. Cylinder 34 is completely filled with a fluid such as water through inlet passage 23 at which time valve 94 is held seated in valve seat 92 by spring 97, preventing water from entering the cupped blank. Plunger 13 commences its downward travel by means of the mechanism more fully described in my aforementioned copending application, Serial No. 861,303, filed December 22, 1959, now Patent No. 3,094,091, thereby sealing off the inlet and overflow passages 23 and 24, as shown in FIG. 2. The buildup of pressure in the water caused by the reduced volume in the cylinder forces valve 94 to open against the pressure of spring 97, thereby filling cupped blank 85 with water. It will be seen in FIG. 2 that dies 60 and 44 are still open since the closure of these dies is controlled by a separate mechanism and not by travel of the plunger. It is necessary that the cupped blank be filled with water and under pressure prior to closing of the dies to prevent collapse of the cupped blank when the blank is deformed upon die closure. The cupped blank may be pre-filled or may be filled entirely from the cylinder. When sufficient pressure is built up in the cupped blank, loop portion 53 is lowered by the camming mechanism described in my abovementioned copending application, thereby lowering the die carrier 56 and upper die 60 through trunnions 54 and 55. At the same time, piston 28 continues its travel in cylinder 34, permitting maximum pressure to be built up in cupped blank 85 after the dies have closed to cause the cupped blank to expand fully and take the contour of the die cavities 45 and 61. The hydraulic pressure is controlled by the piston travel which is adjusted to permit sufficient pressure to cause the cupped blank to fully expand without excessive pressure which could rupture the blank.

After the pressure reaches the maximum desired amount, the piston is withdrawn, thereby reducing the pressure and permitting valve 94 to reseat in valve seat 92 under the pressure of spring 97. Concurrently, loop portion 53 is raised by the camming arrangement by which it is controlled, thereby opening the die halves. In the event that the finished knob 87 becomes stuck in lower die 44, knock-out rod 46 is injected into die cavity 45 by means of a cam also described in my above-mentioned copending application. If the finished knob 87 should, however, remain in die cavity 61 in the upper die, the knob will be ejected by ejecting sleeve 63. Ejecting sleeve 63 is acted upon by ejecting pins (not shown) which are attached to the machine frame, thereby causing relative movement between the ejecting pins and the upper die 60 and ejecting sleeve 63 as the upper die is raised. The ejecting mechanism is also more fully described in my above-mentioned copending application. After piston 28 has been fully raised, the cylinder is refilled with water as required when the piston has cleared inlet passage 23. The water which has been injected into the blank will remain until the completed knob is emptied.

Figure 4:
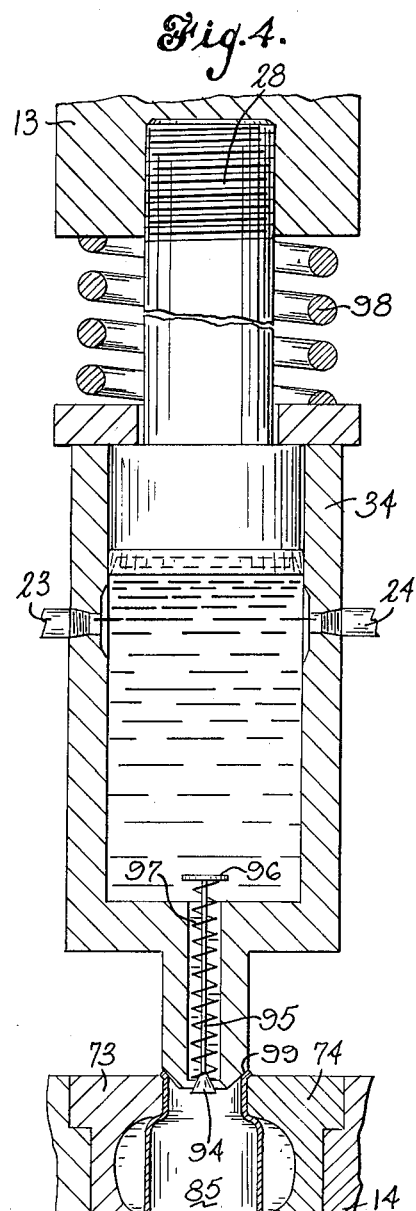
FIG. 4 is an elevational view similar to FIG. 1 showing an alternate construction of the apparatus using horizontally mating dies.
Figure 3:
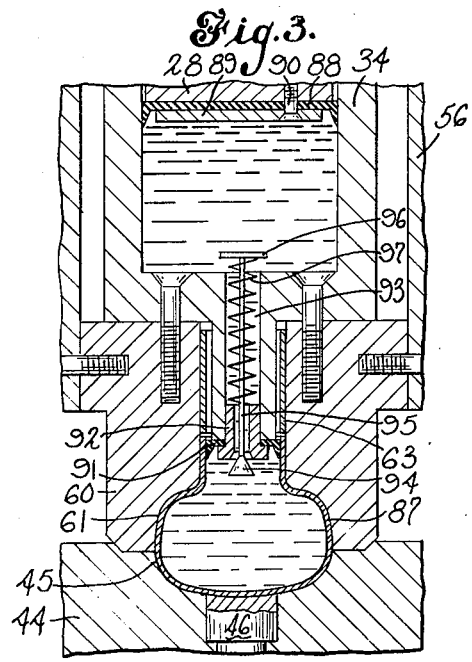
FIG. 3 is an elevational view similar to FIGS. 1 and 2 but taken near the end of the bulging operation.

Referring now to FIG. 4, an alternate construction is shown wherein left and right die halves 73 and 74 are horizontally closed to form the die cavity. In this embodiment the cupped blank 85 is placed in the cavity and the dies are closed. Subsequently, plunger 13 travels downwardly causing cylinder 34 to travel in the same direction since the cylinder and the plunger are yieldably maintained in spaced relation under the force exerted by a spring 98 extending therebetween. The cylinder travels downwardly until its end portion 99 contacts the blank with sufficient pressure to cause a seal between the cylinder and the blank. Thereafter, piston 28 moves downwardly with continued movement of the plunger, causing the blank to be bulged to fill the die cavity as described in FIGS. 1 to 3.

It will thus be seen that the objects set forth above, among those made apparent from the preceding description, are efficiently attained and, since certain changes may be made in carrying out the above method and in the constructions set forth without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which as a matter of language, might be said to fall therebetween.

What is claimed is:

1. An apparatus for bulging a cup-shaped workpiece by hydraulic pressure comprising a pair of dies adapted to enclose the workpiece, a fluid pressure cylinder having a reduced end engaging at least one die and sealingly engaging the open end of said workpiece, a piston slidably mounted in said cylinder, said reduced end of the cylinder having a central passage communicating between said cylinder and said workpiece, a normally closed valve member positioned in the passage and spring-biased to open at a predetermined pressure, and inlet and outlet ports in said cylinder for the entrance of fluid and exhaution of air and excess fluid, said ports positioned adjacent the uppermost position of said piston to meter the fluid in said cylinder and closed by downward movement of said piston, downward movement of said piston exerting pressure on the fluid to cause the fluid to enter the workpiece under pressure and expand the workpiece within said dies.

2. An apparatus for bulging a cup-shaped workpiece by hydraulic pressure comprising a pair of dies adapted to enclose the workpiece, a fluid pressure cylinder having a reduced end engaging at least one of said dies, said reduced end having a central passage communicating between said cylinder and the open end of the workpiece, a normally closed spring-biased valve positioned in said passage adapted to hold the fluid in the cylinder until a predetermined pressure level is reached, inlet and outlet ports for admitting fluid to said cylinder adjacent the upper end of the cylinder, a piston slidably mounted within said cylinder and adapted to close said ports upon initial downward movement thereof, and a flexible sealing ring secured to the reduced end of the cylinder surrounding the valve, said sealing ring having a peripheral projecting lip adapted to engage the interior surface of said workpiece, downward movement of said piston exerting pressure on said fluid to open said valve and enter the workpiece under pressure, and expand the workpiece within said dies.

3. An apparatus for bulging a cup-shaped workpiece by hydraulic pressure comprising a pair of horizontally split upper and lower dies adapted to enclose the workpiece, a fluid pressure cylinder having a reduced end, said upper die being secured to the cylinder and having a central passage receiving the reduced end of the cylinder, said reduced end having a central passage communicating between said cylinder and the open end of the workpiece, a normally closed spring-biased valve positioned in said passage and adapted to open under a predetermined level of fluid pressure, a flexible sealing ring secured to said reduced end surrounding said valve, a peripheral downwardly projecting lip on said sealing ring adapted to engage the interior surface of the workpiece in fluid tight relationship as the pressure in the workpiece increases, a piston slidably reciprocable in said cylinder between upper and lower positions, and inlet and outlet ports for the entrance of fluid into said cylinder positioned adjacent the upper position of said piston, downward movement of said piston initially closing said ports and exerting pressure on the fluid entrapped in said cylinder to open said valve and cause the fluid to enter said workpiece under pressure and expand the workpiece within said dies.

4. An apparatus for bulging a cup-shaped workpiece by hydraulic pressure as set forth in claim 3, including means to close said pair of dies independently of and in timed relation to downward movement of said piston.

References Cited by the Examiner

UNITED STATES PATENTS

| | | | |
|---|---|---|---|
| Re. 10,934 | 5/1888 | Hobson | 113—44 |
| 453,410 | 6/1891 | Langerfeld | 113—44 |
| 788,119 | 4/1905 | Pope | 113—44 |
| 835,100 | 11/1906 | Devine | 113—44 |
| 2,157,044 | 5/1939 | Wendel | 113—44 |
| 2,407,845 | 9/1946 | Stephens | 113—44 |

FOREIGN PATENTS 21,607   10/1914   Great Britain.

CHARLES W. LANHAM, *Primary Examiner.*

WHITMORE A. WILTZ, *Examiner.*